(12) United States Patent
Aagaard et al.

(10) Patent No.: US 9,511,912 B2
(45) Date of Patent: Dec. 6, 2016

(54) CLOSURE FOR A PRODUCT-RETAINING CONTAINER

(71) Applicant: NOMACORC LLC, Zebulon, NC (US)

(72) Inventors: Olav Marcus Aagaard, Rotterdam (NL); Katherine Campbell Glasgow, Wake Forest, NC (US); Malcolm Joseph Thompson, Cary, NC (US); Marco Josef Otto Kirch, Cary, NC (US)

(73) Assignee: NOMACORC, LLC, Zebulon, NC (US)

( * ) Notice: Subject to any disclaimer, the term of this patent is extended or adjusted under 35 U.S.C. 154(b) by 0 days.

(21) Appl. No.: 14/263,473

(22) Filed: Apr. 28, 2014

(65) Prior Publication Data

US 2014/0231430 A1 Aug. 21, 2014

Related U.S. Application Data

(62) Division of application No. 13/416,006, filed on Mar. 9, 2012, now abandoned.

(Continued)

(51) Int. Cl.
*B65D 51/28* (2006.01)
*B65D 1/02* (2006.01)
(Continued)

(52) U.S. Cl.
CPC ......... *B65D 51/2807* (2013.01); *B65D 1/0207* (2013.01); *B65D 1/0215* (2013.01);
(Continued)

(58) Field of Classification Search
CPC . B65D 1/0207; B65D 1/0215; B65D 39/0005; B65D 51/2807; B65D 81/2069; B65D 81/2076; B65D 81/2084; B65D 81/24; B65D 81/3222; C12H 1/14; C12H 1/22
(Continued)

(56) References Cited

U.S. PATENT DOCUMENTS 3,325,035 A  6/1967 Strickman
3,344,093 A  9/1967 Strickman
(Continued)

FOREIGN PATENT DOCUMENTS

CL       199800943    2/1999
WO        9525045 A1  9/1995
WO   WO2004087516A1 A1  10/2004

OTHER PUBLICATIONS

Non-final Office Action for U.S. Appl. No. 13/416,006 mailed Aug. 15, 2014, 9 pages.

(Continued)

*Primary Examiner* — Bryon Gehman
(74) *Attorney, Agent, or Firm* — Withrow & Terranova, P.L.L.C.

(57) ABSTRACT

A closure for a container, such as, for example, a wine bottle, is provided. In one embodiment, the closure includes an oxidant releasing agent that is adapted to release oxygen into an interior portion of the container according to a predefined desired profile. In another embodiment, the closure comprises a gas containing reservoir, a membrane and a barrier layer, the membrane allowing an at least partial exchange of gas between the inside of the reservoir and the inside of the container, and the barrier layer at least partially preventing exchange of gas between the outside of the closure and the inside of the reservoir.

39 Claims, 9 Drawing Sheets

Related U.S. Application Data

(60) Provisional application No. 61/538,242, filed on Sep. 23, 2011, provisional application No. 61/451,192, filed on Mar. 10, 2011.

(51) Int. Cl.
| | | |
|---|---|---|
| *B65D 81/20* | (2006.01) | |
| *B65D 81/24* | (2006.01) | |
| *B65D 81/32* | (2006.01) | |
| *C12H 1/14* | (2006.01) | |
| *C12H 1/22* | (2006.01) | |

(52) U.S. Cl.
CPC ..... *B65D 81/2076* (2013.01); *B65D 81/2084* (2013.01); *B65D 81/24* (2013.01); *B65D 81/3222* (2013.01); *C12H 1/14* (2013.01); *C12H 1/22* (2013.01)

(58) Field of Classification Search
USPC ... 206/205, 213.1, 219–222, 524.8; 215/227, 228, 347, 348, 355–358, 373, 215/375; 220/359.1–359.5
See application file for complete search history.

(56) References Cited

U.S. PATENT DOCUMENTS

| | | | |
|---|---|---|---|
| 4,197,955 A | | 4/1980 | Luenser |
| 5,332,113 A * | | 7/1994 | Kusler et al. ............... 215/249 |
| 5,381,914 A | | 1/1995 | Koyama et al. |
| 5,407,685 A | | 4/1995 | Malchesky et al. |
| 5,806,681 A | | 9/1998 | Frisk |
| 5,904,965 A | | 5/1999 | Noel et al. |
| 6,221,451 B1 | | 4/2001 | Lauer et al. |
| 6,394,264 B2 | | 5/2002 | Riviello, Jr. |
| 6,403,173 B1 | | 6/2002 | Granger et al. |
| 6,511,726 B1 | | 1/2003 | Kinigakis |
| 6,677,016 B2 | | 1/2004 | Riffer |
| 6,689,438 B2 * | | 2/2004 | Kennedy et al. ............ 428/35.7 |
| 6,997,336 B2 | | 2/2006 | Yourist et al. |
| 7,143,903 B2 | | 12/2006 | Musaragno |
| 7,159,374 B2 | | 1/2007 | Abercrombie, III et al. |
| 7,637,082 B2 * | | 12/2009 | Abercrombie et al. ...... 206/219 |
| 8,365,946 B2 | | 2/2013 | Abercrombie et al. |
| 8,431,201 B2 * | | 4/2013 | Malmborg ................... 428/35.7 |
| 8,524,157 B2 | | 9/2013 | Offord et al. |
| 8,671,655 B2 * | | 3/2014 | Abercrombie et al. ... 206/213.1 |
| 9,051,098 B2 * | | 6/2015 | Abercrombie, III ... B65D 51/28 |
| 2003/0017236 A1 * | | 1/2003 | Makita et al. ................ 206/219 |
| 2006/0191419 A1 | | 8/2006 | Spoljaric et al. |
| 2011/0089058 A1 * | | 4/2011 | Abercrombie et al. ...... 206/219 |
| 2012/0118764 A1 | | 5/2012 | Valus et al. |
| 2012/0276357 A1 | | 11/2012 | Soto-Valdez et al. |

OTHER PUBLICATIONS

Patent Examination Report for Australian Patent Application No. 2012224574 mailed Jan. 15, 2015, 4 pages.

Final Office Action for U.S. Appl. No. 13/416,006, mailed Apr. 2, 2015, 8 pages.

Invitation to Pay Additional Fees and, Where Applicable, Protest Fee for PCT/EP2012/054084 mailed Apr. 19, 2012, 5 pages.

Office Action for Canadian patent application 2,829,257 mailed Mar. 10, 2014, 3 pages.

Non-final Office Action for U.S. Appl. No. 13/416,006 mailed Jul. 3, 2013, 8 pages.

Final Office Action for U.S. Appl. No. 13/416,006 mailed Dec. 26, 2013, 9 pages.

Examiner's Report on Chilean Patent Application No. 201302585, issued Jan. 27, 2015, 20 pages.

Office Action for European Patent Application No. 12708023.2, mailed Apr. 2, 2015, 6 pages.

Non-Final Office Action for U.S. Appl. No. 13/416,006, mailed Nov. 27, 2015, 8 pages.

\* cited by examiner

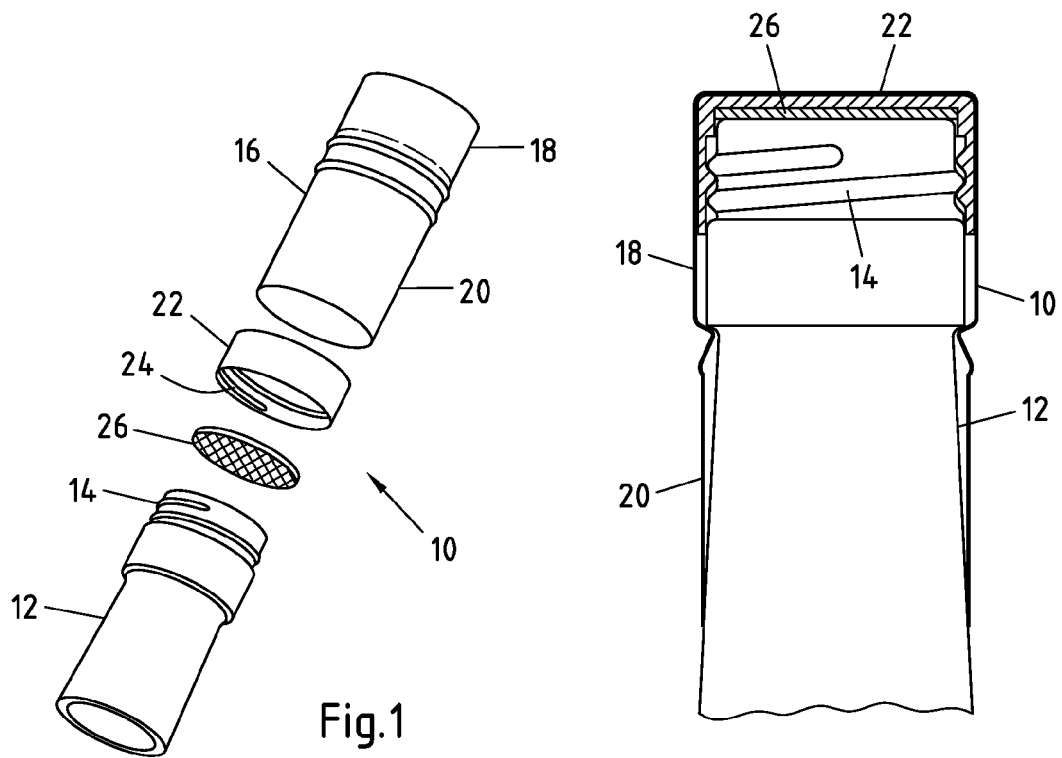
Fig.1
Fig.2
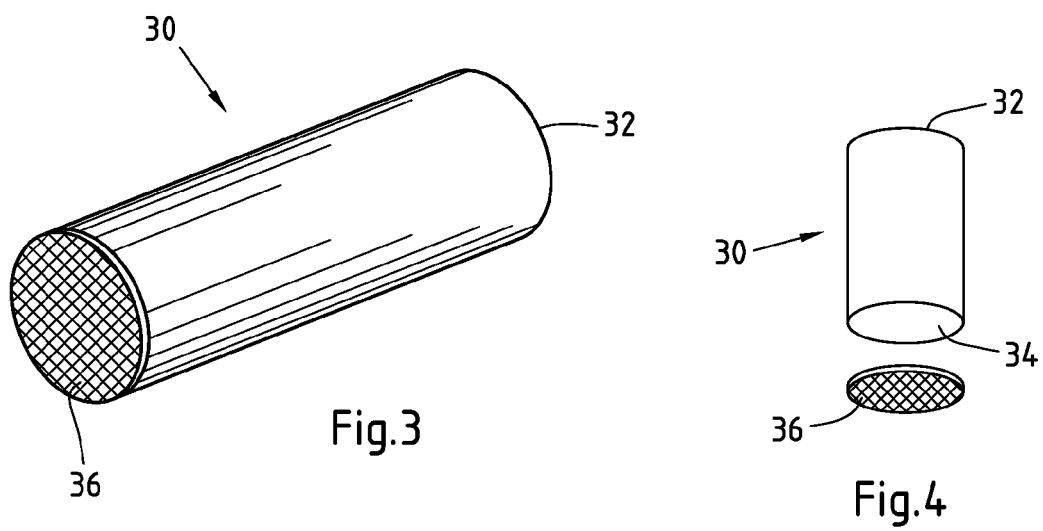
Fig.3
Fig.4
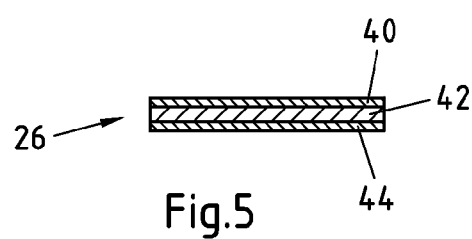
Fig.5

CLOSURE FOR A PRODUCT-RETAINING CONTAINER

PRIORITY APPLICATIONS

The present application is a division of and claims priority to U.S. patent application Ser. No. 13/416,006 filed on Mar. 9, 2012, and entitled "CLOSURE FOR A PRODUCT RETAINING CONTAINER," which published as U.S. Patent Application Publication No. 2012/0228164 on Sep. 13, 2012, and which claims the benefit of and priority to U.S. Provisional Patent Application Ser. No. 61/538,242, filed Sep. 23, 2011, entitled "CLOSURE FOR A PRODUCT RETAINING CONTAINER" and to U.S. Provisional Patent Application Ser. No. 61/451,192 filed Mar. 10, 2011, entitled "CLOSURE FOR A PRODUCT RETAINING CONTAINER."

The applications identified above are incorporated herein by reference in their entireties.

FIELD OF DISCLOSURE

The field of the disclosure relates to a closure for a product retaining container. Moreover, the disclosure relates to a closure system, a liner for a container closure and to a method of manufacturing said closure and said liner.

BACKGROUND

In view of the wide variety of products that are dispensed from containers, numerous constructions have evolved for container closures, including, for example, screw caps, stoppers, corks and crown caps, or the like. Generally, products such as vinegar, vegetable oils, laboratory liquids, detergents, honey, condiments, spices, alcoholic beverages, and the like, impose similar requirements on the type and construction of the closure means used for containers for these products. However, wine sold in bottles represents the most demanding product in terms of bottle closure technology, due to the numerous and burdensome requirements placed upon the closures used for wine bottles. In an attempt to best meet these demands, most wine bottle closures or stoppers have historically been produced from a natural material known as "cork".

While natural cork still remains a dominant material for wine closures, synthetic wine closures have become increasingly popular over the last years, largely due to the shortage in high quality natural cork material and the problem of wine spoilage as a result of "cork taint", a phenomenon that is associated with natural cork materials. In addition, next to synthetic cork stoppers, there has recently been a growing acceptance and use of screw caps as closures for wine bottles. These caps are particularly advantageous due to their relatively low cost, the avoidance of "cork taint" with this type of bottle closure, and the possibility to achieve an airtight, hermetic seal.

Most screw caps contain a liner so as to achieve a substantially airtight, substantially hermetic seal between the closure and the bottle. Such a seal prevents substantially any oxygen transfer through the bottle closure. For certain types of wines, especially white wines, conventional airtight screw-caps may be the closure of choice, as ingress of oxygen impairs the fresh and fruity appeal of these wines, which are usually meant to be consumed young. However, for other types of wines, such as premium class red wines, it is desirable to strike a delicate balance between tightly sealing the bottle content to prevent leakage, avoid contaminants, counteract degradation and spoilage by oxidation, on the one hand, and, on the other hand, permitting a restricted amount of oxygen to enter the container, so as to ensure full maturation of the wine flavor characteristics and prevent the formation of unpleasant aromas. Recent scientific studies appear to confirm what was already accepted empirical knowledge in the traditional art of winemaking: that oxygen is intimately involved in the aging and maturation process of wine. If certain types of wines are completely starved of oxygen for long periods of time, a process known as reduction may give rise to malodorous sulfur compounds such as certain sulphides, thiols and mercaptans. To prevent reduction over the entire period of wine aging and maturation, a minute but constant concentration of oxygen within the container interior is necessary. The olfactory defect occurring otherwise is sometimes referred to as reduced character and can be readily identified by the presence of odors reminiscent of rotten egg, garlic, stagnant water, burnt rubber, struck matches and/or cooked cabbage. Even at low concentrations, these odors may completely ruin a wine's character.

Therefore, bottle closures that ensure a hermetic seal, such as crown or screw caps, are usually not recommended for bottling of wines which require a certain amount of oxygen (from an organoleptic point of view) to diffuse into the interior of the closed bottle. This is the reason why natural cork stoppers—and not screw caps—have been used as closures of choice by many generations of winemakers. Conventional screw caps on the other hand, are used preferentially for bottling wines that are intended for more immediate consumption, in which this aging period is not required or desired. As mentioned hereinbefore, the use of hermetic, airtight closures for wines intended for long periods of aging in the bottle may give rise to reduction processes, which may compromise the organoleptic properties of the wine.

To be able to leverage the advantages of using screw caps also when closing higher quality wines, which need limited oxidation for full organoleptic maturation, closure technology has been developed that allows for controlled ingress of oxygen through microperforated screw cap liners. The total amount of oxygen that the bottled wine will be exposed to depends on the elapsed time period before consumption. There may be a great degree of variation depending on whether the wine was consumed early after bottling or was stored for several years before consumption. Moreover, the method of manufacturing said microperforated breathable screw cap liners is quite labor- and cost-intensive.

There is a need for closures with a defined amount of oxygen being supplied to the bottle content without running the risk of spoilage by either uncontrolled oxidation or complete lack of oxygen, i.e., reduction.

SUMMARY OF THE DETAILED DESCRIPTION

Embodiments disclosed herein provide for closures for containers. In one embodiment, the closure comprises an oxidant releasing agent. Such oxidant may, for example, be oxygen, in which case the oxidant releasing agent may, for example, be a peroxide compound that is able to release oxygen. According to another embodiment, the amount of the oxidant releasing agent may be selected so as to achieve a defined release of oxidant over a defined period of time.

In yet another embodiment, the closure comprises a gas containing reservoir, a membrane and a barrier layer, said membrane allowing an at least partial exchange of gas between the inside of said reservoir and the inside of said container, and said barrier layer at least partially preventing exchange of gas between the outside of said closure and the inside of said reservoir.

While the closure may, in principle, relate to any kind of closure, due to the special requirements in the wine industry, the closure of the present disclosure is particularly useful as a closure for wine bottles such as, for example, a natural or synthetic cork stopper or a screw-cap closure. An alternate embodiment includes a bag in a box wine container such as where the liner of a bag in a box wine container contains an oxidant releasing agent.

Embodiments disclosed herein enable winemakers to choose a closure from a range of distinct and consistent oxygen release rates. This tailoring of the wine closure to the specific oxygen requirements of a particular type of wine, allows wineries to optimize the oxygen-dependent flavor and wine character development for each of their wine product lines and at the same time prevent the formation of unpleasant aromas associated with reduction.

While embodiments of the present disclosure are well suited for use in the wine industry, the disclosure is not so limited. Rather, the concepts of the present disclosure can be extended to other containers that have need of an agent released slowly into the product contained within the container. The agent may be impregnated within a liner disposed within the container or integrated into the body of the container.

BRIEF DESCRIPTION OF THE FIGURES

Further features and advantages of the embodiments disclosed herein will become apparent from the following detailed description of some of its embodiments shown by way of non-limiting examples in the accompanying drawings, in which:

FIG. 1 is an exploded schematic view of a first exemplary embodiment of a screw cap type closure according to one embodiment of the present disclosure;

FIG. 2 is a longitudinal-section schematic view of the components shown in FIG. 1;

FIG. 3 is a schematic view of a second exemplary embodiment of a cork type closure according to one embodiment of the present disclosure;

FIG. 4 is an exploded schematic view of the embodiment shown in FIG. 3;

FIG. 5 illustrates a cross-sectional view of a liner according to an exemplary embodiment of the present disclosure;

DETAILED DESCRIPTION

Figure 6:
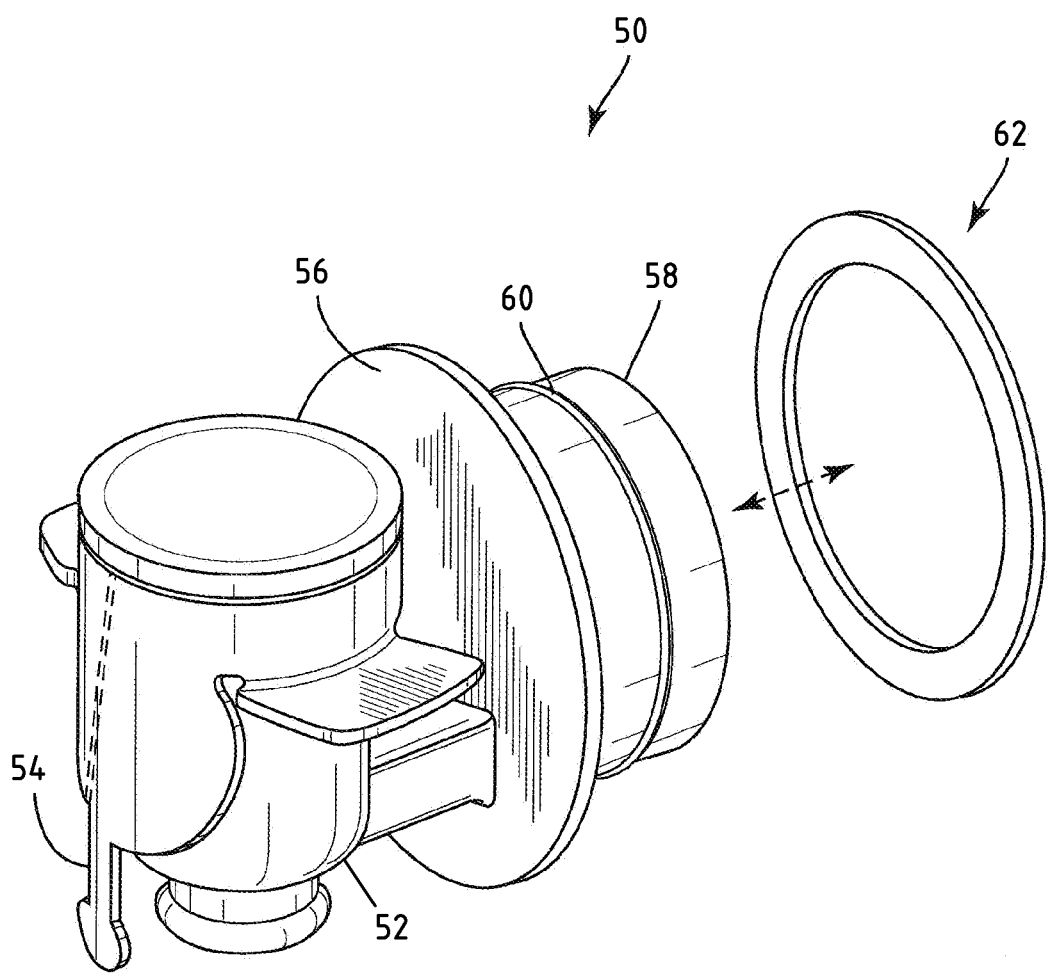
FIG. 6 illustrates an exploded perspective view of a bag in a box closure according to an embodiment of the present disclosure.
Figure 7:
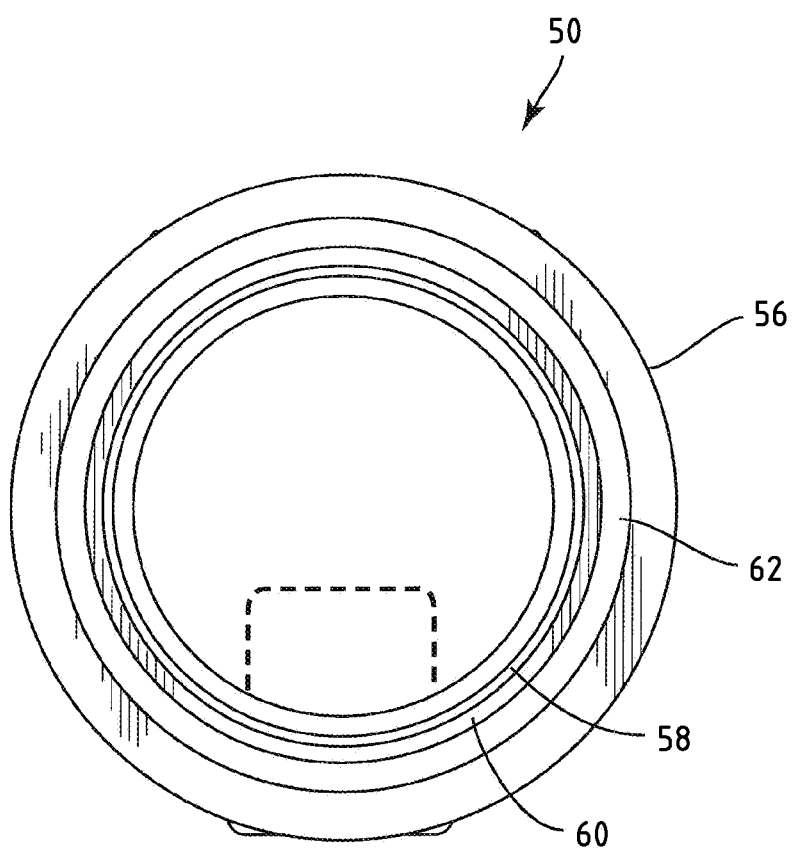
FIG. 7 illustrates a rear elevational view of the closure of FIG. 6.

By referring to FIGS. 1 to 15, along with the following detailed disclosure, the construction of the closure of the certain embodiments disclosed herein can best be understood.

In these Figures, as well as in the following detailed disclosure, the closure of various ones of the embodiments is depicted and discussed as a bottle closure for wine products. However, the various embodiments can be applicable as a closure for use in sealing and retaining any desired product in any desired closure system. Due to the stringent and difficult demands and requirements placed upon closures for wine products, the following detailed disclosure focuses upon the applicability of the synthetic bottle closures as a closure for wine bottles. Nevertheless it is to be understood that this detailed discussion is provided merely for exemplary purposes and is not intended to limit the embodiments disclosed herein to this particular application and embodiment.

Embodiments disclosed herein provide for a closure for a product retaining container wherein the closure comprises an oxidant releasing agent. Furthermore, embodiments disclosed herein provide for a closure for a product retaining container wherein the closure comprises a gas containing reservoir, a membrane and a barrier layer, said membrane allowing an at least partial exchange of gas between the inside of said reservoir and the inside of said container, and said barrier layer at least partially preventing exchange of gas between the outside of said closure and the inside of said reservoir.

Embodiments disclosed herein provide for closures for containers. In one embodiment, the closure comprises an oxidant releasing agent. Such oxidant may, for example, be oxygen, in which case the oxidant releasing agent may, for example, be a peroxide compound that is able to release oxygen. According to another embodiment, the amount of the oxidant releasing agent may be selected so as to achieve a defined release of oxidant over a defined period of time.

While the closure may, in principle, relate to any kind of closure, due to the special requirements in the wine industry, the closure of the present disclosure is particularly useful as a closure for wine bottles such as, for example, a natural or synthetic cork stopper or a screw-cap closure. An alternate embodiment includes a bag in a box wine container such as where the liner of a bag in a box wine container contains an oxidant releasing agent.

As used herein the term "product retaining container" is meant to include bottles, jars, flasks, canisters, tins, vials and the like. In an exemplary embodiment, the product retaining container is a wine bottle. The term "closure" as used herein applies to any means for effectively closing product retaining containers in general. Such closures include, but are not limited to, screw caps, stoppers, corks, crown caps, latches, seals and lids. According to one embodiment, the closure is selected from the group consisting of a bottle cap, such as a screw cap or a crown cap, and a cylindrically shaped bottle stopper. Examples for screw caps include, but are not limited to, roll-on pilfer proof screw caps ("ROPP") and roll-on tamper evident screw caps ("ROTE"). According to an embodiment, the material for the closure may, for example, be selected from the group consisting of metal, polymer material, glass, natural materials such as cork, ceramic, steel, and rubber and combinations thereof.

According to an exemplary embodiment, the closure may, for example, be a screw cap closure. Screw cap closures typically comprise a cap having interior threads adapted to interoperate with exterior threads on a container opening (e.g., on the upper opening of a bottle). In addition, the cap closures typically comprise a seal. The interior threads of the cap may, for example, be formed by pressure forming the cap (e.g., a cap made from aluminum metal) onto the exterior threads on the container opening (e.g., on the opening of a bottle during the bottling process). Materials for and methods of manufacturing a screw cap closure are known to the person skilled in the art and, for example, described in U.S. Pat. No. 6,403,173 B1, which is hereby incorporated herein by reference in its entirety. Referring now to FIGS. 1 and 2, a screw cap closure 10 adapted to fit on a wine bottle 12 is illustrated. In this embodiment, the wine bottle 12 includes threads 14 on an upper opening as is well understood. The screw cap closure 10 includes an outer metal cap 16 having a head 18 and a skirt 20, a threaded plastic insert 22 having interior threads 24 and adapted to interoperate with threads 14 of the wine bottle 12, and possibly a seal 26, if the plastic insert 22 does not perform the sealing function. An advantage of this type of screw cap closure 10 is that the outer metal cap 16 is itself not threaded, which improves the aesthetic quality of the cap.

In an alternate embodiment, the closure of the present disclosure may be a natural or synthetic stopper. Referring now to FIGS. 3 and 4 such stoppers 30 may have a substantially cylindrical shape and substantially flat terminating ends 32, 34. They may be made of natural cork and/or of polymer material. According to one embodiment, these stoppers may have a cylindrically shaped core member (not shown) formed from foamed plastic material and at least one independent layer of foamed or non-foamed plastic material (not shown) peripherally surrounding and intimately bonded to the core member with the flat terminating end surfaces 32, 34 of the core member being devoid of said outer layer. Such synthetic stoppers are described in U.S. Pat. No. 6,221,451 B1, which is hereby incorporated herein by reference in its entirety.

The stopper 30 may further include a liner 36, which may be made from a polymer material. Exemplary commercially available liners such as Saran liners, Saranex liners, Sarantin liners or Stelvin liners may form the liner 36. These liners 36 generally combine multiple layers selected from the group consisting of polymer materials such as polyethylene, polyvinylidene chloride (PVDC) and laminates thereof, saran film, metal foil and wadding material such as foamed polymer material or fiber card (paper). According to a particular embodiment, the liner 36 may include a deformable composite in which the layers are selected from the group consisting of monolayers or combinations of PVDC, Nylon, filled Nylon, EAA, EVOH, starch, cellulose, PET, PP, PE, EVA, PEO, styrene block copolymers, COC, polystyrene, polycarbonate and silicone and co-polymers of the above polymers.

According to yet another aspect, the liner 36 may provide for a substantially liquid and/or gas tight, hermetic seal at the interface between the container (e.g., wine bottle 12) and the closure or stopper 30. This may be achieved, for example, by having the liner 36 include a barrier layer to prevent or reduce permeation of gases through the stopper 30. Such barrier layer may, for example, be a metal film layer selected from the group consisting of an aluminum film layer and a tin film layer. Further possible barrier layers may comprise other gas-impermeable materials selected from the group consisting of glass, steel, polymeric materials, PVDC-laminates and the like and also combinations thereof. Liners with such barrier layers are known in the art as evidenced by U.S. Pat. No. 6,677,016 B2, which is hereby incorporated herein by reference in its entirety.

According to another aspect, the oxidant releasing agent may be included in the liner 36 or the seal 26 described above. Accordingly, embodiments disclosed herein also relate to a seal 26 having an oxidant releasing agent. As illustrated in FIG. 5, the seal 26 may include a metal film layer 40. In the case of a multilayer closure element, the oxidant releasing agent is preferentially contained in one of the innermost element or layers 42 facing the interior of the product retaining container. A thin polymer film 44 or the like can be used to prevent the oxidant releasing agent to come into direct contact with the bottle content.

In another embodiment, liner 36 or seal 26, which includes the oxidant releasing agent is selected from the group consisting of the entire closure, an area defining part of the closure, a liner that can be fitted between container and the remainder of the closure and a layer defining part of said liner. Furthermore, said element of polymer material may comprise foamed polymer material.

In an alternate embodiment, the concepts of the present disclosure may be applied to other wine containers, such as the proverbial "bag in a box" wine container. "Bag in box" containers generally comprise a flexible bag made of one or several layers of plastic film or metallised film. The bag is constructed for storage of liquids, such as wine, and is typically provided with a dispensing unit such as an airtight tap 50 (illustrated in FIGS. 6 and 7) for dispensing of the stored liquid. The bag is seated inside a box, typically inside a cardboard box or inside a corrugated fiberboard box. Tap 50 may be a conventional tap having a spigot 52, dispensing lever 54, and flange 56 disposed outside the box. Plug 58 with ridge 60 may be disposed inside the box and engage the bag as is well understood. A ring or loop 62 may fit around the plug 58. The ring or loop 62 is annular, but otherwise constructed in a fashion similar to the seal 26 or liner 36 and performs the same function. The ring or loop 62 may alternatively be disposed inside the plug 58. Regardless of position, the ring or loop 62 should be in contact with the interior portion of the bag so that the oxygen releasing agent within the ring or loop 62 is allowed to interact with the space within the bag. While a ring or loop 62 is specifically contemplated, the element may take other shapes as needed or desired and still perform the same function.

The oxidant releasing agent may, for example, be a chemical, a catalyst or an enzyme capable of releasing an oxidant into the interior of the product retaining container. In a preferred embodiment the oxidant releasing agent should satisfy common food safety regulations. According to the embodiments, the oxidant releasing agent may, for example, be selected from the group consisting of peroxides, superoxides, ozonides, chlorates, perchlorates, borates, perborates, percarbonates, perphosphates, perpyrophosphates, persilicates, persulfates, thiosulfates, peroxydisulfates, peroxy compounds, and their salts and precursors, and combinations thereof. Moreover, said oxidant releasing agent can be selected from the group consisting of inorganic, organic and polymeric compounds, and combinations thereof. In another embodiment said oxidant releasing agent is selected from the group consisting of superoxides and peroxides of alkali metals and alkaline earth metals, and combinations thereof. In another embodiment said oxidant releasing agent is selected from the group consisting of potassium superoxides and magnesium superoxides, and combinations thereof. Furthermore, said oxidant releasing agent may, for example, be selected from the group consisting of peroxycarboxylic acids and sulfone peroxycarboxylic acids, and combinations thereof. Possible further oxidant releasing agents can be inorganic or organic oxides and hydroxides such as for example magnesium hydroxide or magnesium oxide. Moreover, foamed material may constitute the oxidant releasing agent. In another embodiment the oxidant releasing agent is selected from the group consisting of catalysts and enzymes catalyzing reaction releasing oxidant molecules, and combinations thereof. In particular, said catalysts or enzymes may generate oxidants by conversion of a precursor substance.

Preferably, the released oxidant itself is selected from the group consisting of molecular oxygen, hydrogen peroxide and superoxide, and combinations thereof.

According to another embodiment, the oxidant releasing agent releases oxidant only after exposure to an activator, being substantially inactive prior to this exposure. This embodiment allows the oxidant releasing capability of the closure to remain dormant throughout the bottling process until the oxidant releasing mechanism is triggered by the activator. According to another embodiment, said activator may, for example, be selected from the group consisting of moisture, acidic solution, basic solution, vapor, liquid, temperature change, and light, and combinations thereof. In particular, temperature change pertains to heat or cold. In yet another embodiment, said activator may be released by the product contained in the container.

According to yet another aspect, the amount of oxidant releasing agent may be selected so as to achieve a defined rate of oxidant release from the screw cap closure 10 over a defined period of time so as to result in a defined total amount of oxidant released. In general one or more embodiments disclosed herein provides a screw cap closure 10 comprising an oxidant releasing agent, which ensures a slow, substantially constant and well defined oxygen release rate over a defined period of time, so as to prevent reduction while maintaining consistency. It is expected that the amount of oxidant released will go to zero in a certain period of time. Accordingly, in an exemplary embodiment, the amount of oxidant releasing agent may be selected so as to achieve the oxygen release rate going to zero after a period selected from the group consisting of 10, 5, 4, 3, 2 years and 1 year. In the case that the oxidant releasing agent is comprised in an element of polymer material, according to the embodiments disclosed herein, the concentration of oxidant releasing agent in the polymer material can range from 0.01% by weight to about 10% by weight based on the weight of the polymer material. Possible other concentrations for the oxidant releasing agent in the polymer material can range from close to 0.01% by weight to about 5% by weight or 0.01% by weight to about 2% by weight or 0.01% by weight to about 1% by weight or 0.01% by weight to about 0.1% by weight based on the weight of the polymer material. There may also be circumstances where concentrations for the oxidant releasing agent in the polymer material are desirable that range from close to 0% by weight to about 1% by weight or from close to 0% by weight to about 0.5% by weight or from close to 0% by weight to about 0.1% by weight or from close to 0% by weight to about 0.01% by weight based on the weight of the polymer material.

According to yet another aspect, the amount and type of oxidant releasing agent may be selected based on the oxygen requirements associated with the wine being closured. The two types of screw cap liners currently most used in the wine industry are foil/PVDC laminates and PVDC laminates. Typically, a standard 30 mm diameter foil cap liner, when well sealed to a bottle, has an oxygen diffusion rate of approximately 0.0002 cc oxygen per 750 mL bottle per 24 hours. Typically, a well sealed 30 mm PVDC cap liner has a diffusion rate of approximately 0.002 cc oxygen per 750 mL bottle per 24 hours. Recent studies appear to show that the oxygen diffusion rate of top quality natural cork stoppers falls between that of the foil and PVDC liner containing screw cap closures. Embodiments disclosed herein enable winemakers to choose screw cap closures 10 containing oxidant releasing agents that feature customized oxygen release rates for their closures that fall between these values. A winemaker bottling a white wine, for instance, may desire a screw cap closure 10 according to an embodiment with an oxygen release rate into the interior of the bottle of approximately 0.0005 cc per 750 mL bottle per day. Accordingly, the winemaker may select a screw cap closure 10 made using the technology having an oxygen release rate in the range of, for example, about 0.0004 to 0.0006 cc oxygen per screw cap closure 10 per 24 hours. Similarly, a heavy red wine, which the winemaker wants to age in the bottle, will require more oxygen and could be capped with a closure 10 having release rates in the range of, for example, about 0.0007 to 0.0015 cc oxygen per bottle per 24 hours. In a further embodiment oxygen release rates of the closure 10 into the bottle interior can be 0.00005-0.002, 0.00005-0.001, 0.00005-0.0005, 0.00005-0.0002, 0.00005-0.0001, and 0.0001-0.002 cc oxygen or oxidant per 24 h per 750 mL bottle. There may also be circumstances in which oxygen release rates higher than 0.002 cc oxygen per 750 mL bottle per 24 hours are desirable.

During the bottling process there is a high chance that oxygen is trapped in the headspace between the bottle content and the closure 10. Moreover, it appears that immediately after closing wine bottles with natural or synthetic cork stoppers, off-gassing of air from the compressed cork material further contributes to an initially high local oxygen concentration in the bottle interior. To counteract the initially high oxygen concentration, which could lead to uncontrolled oxidation of the wine, a closure 10 may further comprise oxygen scavenging agents. Said oxygen scavenging agent can effectively antagonize and decrease the initially high oxygen concentration immediately after bottling. During long term bottle storage, the oxidant releasing agent present in the closure 10 would nonetheless ensure a defined amount of oxygen to be consistently released into the container interior over a defined period of time.

In a further embodiment, the oxygen scavenging agent could also be used to antagonize and fine-tune the amount of oxygen present in the bottle, which may have been actively released by the oxidant releasing agent or may have passively permeated through the bottle closure. Said oxygen scavenging agent may be contained in an element of the closure selected from the group consisting of the element of polymer material comprising the oxidant releasing agent, the entire closure 10, an area defining part of the closure, a seal 26 or liner 36 that can be fitted between container (e.g., wine bottle 12) and the remainder of the closure and a layer defining part of said liner. According to the other embodiments disclosed herein, the oxygen scavenging agent may be contained in the same or in a different element of the closure 10 than that containing the oxygen releasing agent (e.g., in layer 42 or some other element). Possible oxygen scavenger agents are selected from the group consisting of ascorbates, sulfites, EDTA, hydroquinone, tannins and the like, and their salts and precursors, and combinations thereof. In a preferred embodiment, the oxygen scavenger agent is selected from the group consisting of sodium ascorbate, sodium sulfite and potassium EDTA, iron or other metal based scavengers, and combinations thereof.

Embodiments disclosed herein also encompass a closure system comprising a product retaining container and a closure 10 as defined above, e.g., a wine bottle sealed with a closure 10 according to the embodiments disclosed herein. Moreover, the embodiments disclosed herein can specifically include the use of an oxidant-releasing agent containing closure 10 as described above for delivering a predefined amount of oxygen to the interior of a product retaining container over a defined period of time.

The closure can be manufactured by methods known to the person skilled in the art. Suitable methods of manufacture may comprise the step of introducing an oxidant releasing agent into a closure 10. In a preferred embodiment, the manufacturing steps are selected from the group consisting of coating, spray deposition, injection molding, extrusion, co-extrusion and foaming, and combinations thereof. This is particularly the case when the oxidant releasing agent is comprised in a liner 36. A method for manufacturing said liner 36 may comprise manufacturing steps being selected from the group consisting of coating, spray deposition, injection molding, extrusion, co-extrusion and foaming, and combinations thereof. Suitable methods of manufacturing a liner 36 for wine bottle closures are known to the person skilled in the art and for example described in detail in previously incorporated U.S. Pat. No. 6,677,016 B2. A closure 10 can also be manufactured by applying an element of thin polymer film 44 containing an oxidant-releasing agent to a closure 10 or a portion thereof by means of coating, spray deposition, injection molding, extrusion, co-extrusion and foaming. Accordingly, embodiments disclosed herein also relate to a method of manufacturing a closure comprising an oxidant-releasing agent.

EXAMPLES

Hereinafter, certain exemplary embodiments are described in more detail and specifically with reference to the examples, which, however, are not intended to limit the present disclosure.

Example 1

Screw Cap Containing an Oxidant Releasing Liner

A screw cap closure is produced, consisting of a liner 36, an outer metal cap 16 and a surrounding metal skirt 20. The oxidant releasing agent is contained in the liner 36, which is built up of the following layers from bottom (facing the contained product) to top (contacting the lid of the screw cap): A very thin first polymer film layer of low-density polyethylene (LDPE) 44; a polymer layer 42 containing the oxidant releasing agent; a bather layer 40 disposed on said polymer layer 42, that includes a polyvinylidene chloride (PVDC) laminate in combination with a metal foil (typically aluminum or tin) disposed on the PVDC layer; fiber card (paper) or polymer foam and a second LDPE polymer film layer. The metal film of the barrier laminate has a very low oxygen diffusion rate, and thereby prevents oxygen from diffusing through the cap liner into the bottle and product contained therein. The oxidant releasing agent in the liner 36 releases in a low but constant rate hydrogen peroxide into the headspace of the wine bottle 12. The hydrogen peroxide spontaneously decomposes to free oxygen and water. The thus generated oxygen dissolves into the wine, where it prevents reduction of the latter and promotes the maturation of the desired wine flavor characteristics.

Example 2

Synthetic Stopper with Oxygen Releasing Polymer Film Affixed Thereto

A synthetic wine closure such as stopper 30 of substantially cylindrical shape consisting of a foamed polymer core member and an outer skin is produced by means of coextrusion. In a subsequent step, a thin polymer film 36 containing an oxidant releasing agent is affixed to the substantially flat terminating ends of the stopper. The thus obtained closure 30 is used for the bottling of red wines. As these require a period of aging with a certain amount of oxygen present for the full maturation of the wine's flavor characteristics, the oxygen released by the liner 36 ensures optimal flavor development and prevents the formation of unpleasant aromas associated with reduction.

Figures 8, 9:
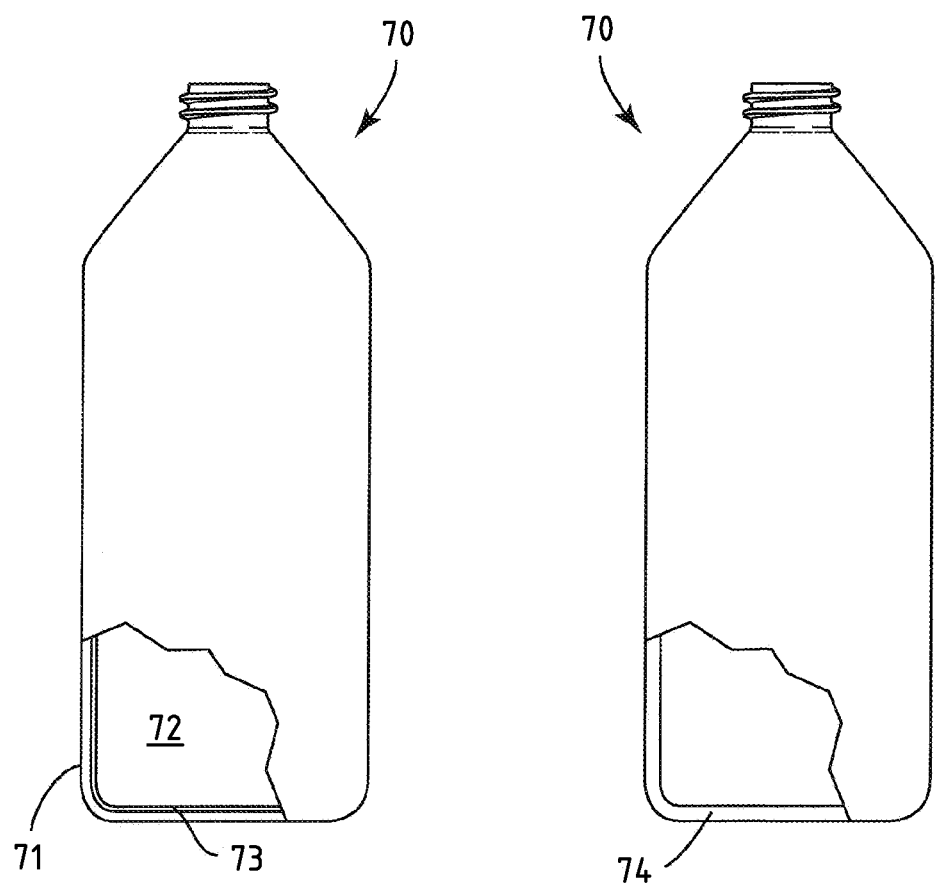
FIG. 8 illustrates a bottle having a liner according to an alternate embodiment of the present disclosure.
FIG. 9 illustrates a bottle having an impregnated sidewall according to still another alternate embodiment of the present disclosure.

The technology described herein is not restricted to closures but may also be applied to packages in general. Furthermore, the technology may be incorporated into a liner associated with the package or incorporated directly into the package. For example, as illustrated in FIGS. 8 and 9, a bottle 70 may incorporate the present technology. In FIG. 8, the bottle 70 has a sidewall 71 delimiting the interior 72. A liner 73 is positioned within the interior 72 and impregnated with the oxygen releasing agent as previously discussed. In contrast, in FIG. 9, the bottle 70 has a sidewall 74 with the oxygen releasing agent embedded therewithin.

Figure 10:
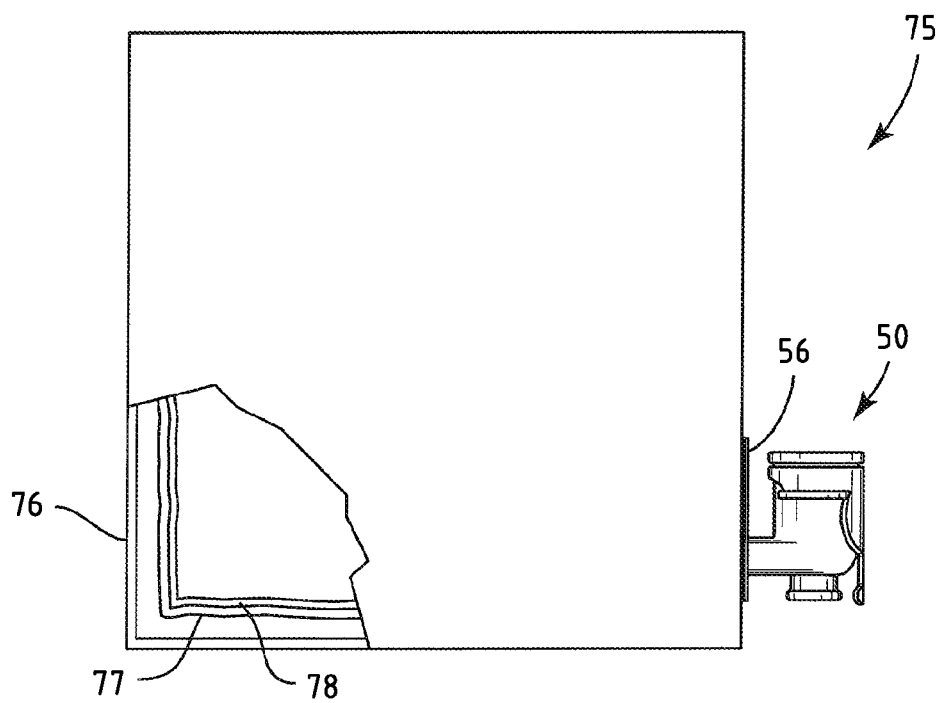
FIG. 10 illustrates a bag in a box having a liner according to an alternate embodiment of the present disclosure.
Figure 11:
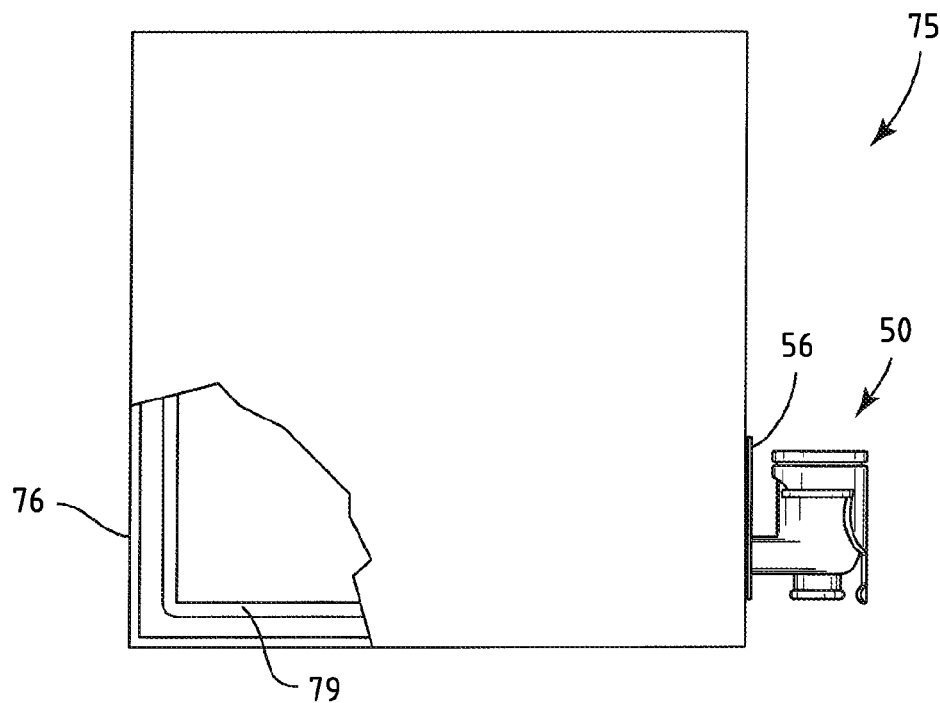
FIG. 11 illustrates a bag in a box wherein the bag is impregnated according to still another alternate embodiment of the present disclosure.

Similarly, the concepts of the present disclosure may be extended to bag-in-a-box containers. As illustrated in FIG. 10, a bag in a box container 75 may include a sidewall 76 that forms the box. Inside the sidewall 76 is a bag 77. A liner 78 is positioned inside the bag 77. The liner 78 has an oxygen releasing agent impregnated therein as previously described. Similarly, FIG. 11 illustrates an alternate embodiment, wherein the bag 79 is constructed such that the oxygen releasing agent is embedded directly into the bag.

In another alternate embodiment the closure may comprise a gas containing reservoir, a membrane and a barrier layer, said membrane allowing an at least partial exchange of gas between the inside of said reservoir and the inside of said container, and said barrier layer at least partially preventing exchange of gas between the outside of said closure and the inside of said reservoir.

The gas containing reservoir is designed so as to allow a controlled exchange of gas from the inside of the reservoir into the inside of said container, i.e., for example into the empty space in the container between the product and the closure (head space). According to one embodiment of the disclosure the exchange of gas may take place by means of permeation. Alternatively, the exchange of gas may also take place by other means, for example by means of microperforation. According to yet another exemplary embodiment of the disclosure the gas containing reservoir may also comprise an oxidant releasing agent as defined herein.

Suitable gases that may be contained in the reservoir include, but are not limited to, air, oxygen, ozone, nitrogen, sulfur oxides (in particular: sulfur dioxide), carbon oxides (in particular: carbon dioxide) and mixtures thereof. According to one aspect of the invention the reservoir is filled with air.

According to another aspect of the disclosure the gas containing reservoir may extend into the inside of the container, which may, for example, be a wine bottle. By extending into the inside of the container, the reservoir reduces the headspace above the filling level of the container. Thus, in the case of a wine bottle, by extending into the portal forming neck of the wine bottle the reservoir reduces the headspace above the fluid level of the wine bottle. According to another aspect of the disclosure, the reservoir is adapted to be located in the inside of the container whereby the outer walls of the reservoir are devoid of contact with an inner wall of the container. Thus, in the case of a wine bottle, the reservoir may be adapted to be located within the mouth of the bottle while the outer walls of the reservoir are devoid of contact with an inner surface of the mouth of the bottle. In another aspect of the disclosure the reservoir may be adapted to be located in the inside of the container so that it does not effect a seal with an inner surface of the container (e.g., with an inner surface of the mouth of a bottle). In this aspect of the disclosure effecting a seal may in particular be avoided during insertion and/or extraction of the reservoir into the container (e.g., into a mouth of a bottle).

The reservoir may have any desired volume and shape. Suitable shapes of the reservoir may include, but are not limited to, for example, a substantially cylindrical shape, a substantially conical shape, a substantially half spherical shape, or a substantially dome shape. According to one aspect of the disclosure, the reservoir may have a substantially cylindrical shape. According to another aspect of the disclosure the reservoir may be substantially in alignment with a portal forming neck of the container, i.e., for example, with the portal forming neck of a wine bottle.

According to another aspect of the disclosure, the reservoir may contain a gas volume of 0.01 to 30 cc at ambient pressure and ambient temperature, in particular of 0.1 to 15 cc, or 0.5 to 10 cc at ambient pressure and ambient temperature.

The membrane is constructed so as to allow an at least partial exchange of gas between the inside of the reservoir and the inside of the container. By way of example, such exchange of gas may take place by means of permeation through the membrane. The membrane may be made of any suitable material including, but not limited to, plastic material. For example, the membrane may be a plastic film, a laminated film, a multi-layer film, a metalized plastic film, an injection molded plastic part, an extruded plastic part, a co-extruded plastic part, a vacuum-formed plastic part, a blow-molded plastic part, a deep-drawn plastic part or the like. The membrane may form an integral part of the reservoir (e.g., the bottom flat terminating end of a cylindrically shaped reservoir). Alternatively, the membrane may form a separate part of the closure (e.g., a separate plastic film arranged at or affixed to the bottom flat terminating end of a cylindrically shaped reservoir).

According to one aspect of the disclosure the membrane may have an oxygen permeation of about 0.00001 to about 0.1 cc/day per container in 100% air at ambient pressure and ambient temperature, in particular of about 0.00005 to about 0.05 cc/day per container, or 0.0001 to about 0.01 cc/day per container, or 0.0005 to about 0.005 cc/day per container. Air as used herein is defined to contain approximately 20.8 vol. % oxygen. According to another aspect of the disclosure, the membrane may have an oxygen permeation at ambient pressure and ambient temperature that is different from that of the barrier layer. According to yet another aspect of the disclosure, the membrane may have an oxygen permeation at ambient pressure and ambient temperature that is greater than that of the barrier layer.

The barrier layer is constructed so as to at least partially prevent exchange of gas between the outside of the closure and the inside of the reservoir. In particular, the barrier layer may for example be constructed so as to at least partially prevent exchange of gas between the outside of the closure and the inside of the reservoir by means of permeation. The barrier layer may be made of any suitable material including, but not limited to, metal, plastic material, laminated plastic material and metalized plastic material. For example, the barrier layer may be a metal film, a plastic film, a laminated film, a multi-layer film, a metalized plastic film, an injection moulded plastic part, an extruded plastic part, a co-extruded plastic part, a vacuum-formed plastic part, a blow-molded plastic part, a deep-drawn plastic part or the like. The barrier layer may form an integral part of the reservoir (e.g., the top flat terminating end of a cylindrically shaped reservoir). Alternatively, the barrier layer may form a separate part of the closure (e.g., a separate film arranged at or affixed to the top flat terminating end of a cylindrically shaped reservoir).

According to one aspect of the disclosure the barrier layer may have an oxygen permeation of about 0 to about 0.05 cc/day per container in 100% air at ambient pressure and ambient temperature, in particular of about 0 to about 0.01 cc/day per container, or of about 0 to about 0.002 cc/day per container, or of about 0 to about 0.001 cc/day per container in 100% air at ambient pressure and ambient temperature. According to another aspect of the disclosure the barrier layer may have an oxygen permeation at ambient pressure and ambient temperature that is different from that of the membrane. According to yet another aspect of the disclosure, the barrier layer may have an oxygen permeation at ambient pressure and ambient temperature that is smaller than that of the membrane. According to yet another aspect of the disclosure, the barrier layer and the membrane may have about the same oxygen permeation at ambient pressure and ambient temperature.

According to another aspect of the disclosure, the closure may further comprise a body made of metal or polymer material, or a combination thereof. Suitable metals for the body may include, but are not limited to, for example, aluminum, tin, and/or alloys thereof. Suitable polymers for the body may include, but are not limited to, for example, PE, PP, PET, LDPE, styrene block copolymers, EVA, and/or HDPE, and/or mixtures thereof.

According to yet another aspect, the disclosure relates to a closure system comprising a closure as described herein and a product retaining container. The product retaining container may be of any desired shape, size and material. According to one aspect of the disclosure, the product retaining container may be a wine bottle.

According to yet another aspect, the disclosure relates to a container comprising: (1) a closure as described herein; and (2) a product. The container may be wholly or partially filled with any kind of product, in particular with foodstuffs, for example with liquids (e.g., wine or spirits) or solids (e.g., spices). According to one embodiment of the disclosure, the container is a wine bottle made of glass or plastic that is wholly or partially filled with wine and sealed with a closure as described herein.

According to yet another aspect, the disclosure relates to a method of adjusting the oxygen content in a container (e.g., a wine bottle) over a defined period of time comprising: (1) filling the container with a defined quantity of product (e.g., with wine), and (2) closing the container with a closure as described herein, so that oxygen is allowed to be released from the reservoir into the head space of the container or into the product (e.g., into the wine).

In such method, the defined period of time may vary depending on the nature and/or quantity of product contained in the container. For example, if wine is used as product, the defined period of time may vary between about 1 day and about 10 years, more particularly between about 30 days and about 5 years, or between about 60 days and about 3 years, or between about 90 days and about 2.5 years, or between about 180 days and about 2 years.

According to a further embodiment of the disclosure, at the beginning of the defined period of time the oxygen permeation rate into the headspace of the container or into the product may be substantially equal to the permeation rate of oxygen through the membrane at that time. According to yet another embodiment of the disclosure, at the end of the defined period of time, the oxygen permeation rate into the headspace of the container or into the product may be substantially equal to the permeation rate of oxygen through the barrier layer at that time.

Figure 12:
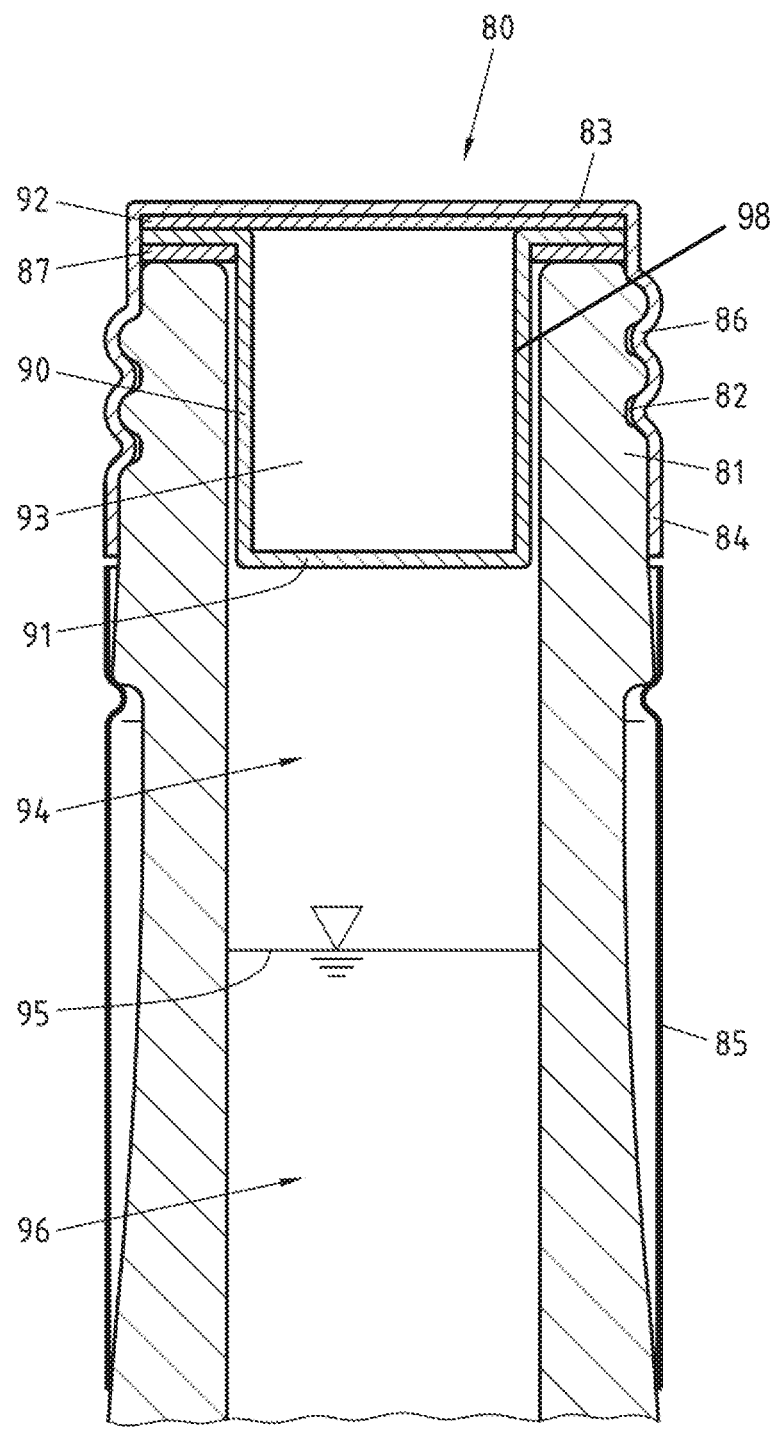
FIG. 12 is a longitudinal-section schematic view of a closure according to an exemplary embodiment of the present disclosure fitted on a wine bottle.

According to an exemplary embodiment, the closure may, for example, be a screw cap closure. Referring now to FIG. 12, a screw cap closure 80 adapted to fit on a wine bottle 81 is illustrated. In this embodiment, the wine bottle 81 includes threads 82 on an upper opening as is well understood. The wine bottle 81 is filled with wine 96 up to a certain fluid level 95. In fitted position, the screw cap closure 80 includes an outer metal cap 83 having a head 84 and a skirt 85, interior threads 86 adapted to interoperate with threads 82 of the wine bottle 81 and a seal 87. The screw cap closure 80 further includes a cylindrically shaped reservoir 90 having a membrane 91 forming the bottom flat terminating end of the cylindrically shaped reservoir 90 and a barrier layer 92 forming the top flat terminating end of the cylindrically shaped reservoir 90, with a cylindrical sidewall 98 extending between the membrane 91 and the barrier layer 92. The inside 93 of reservoir 90 is filled with a gas such as, for example, air or oxygen. The membrane 91 allows permeation of gases between the inside 93 of reservoir 90 and the head space 94 above the fluid level 95 of the wine bottle 81 filled with wine 96, thus replenishing oxygen into the head space 94 of the wine bottle 81 for a defined period of time.

Figure 13:
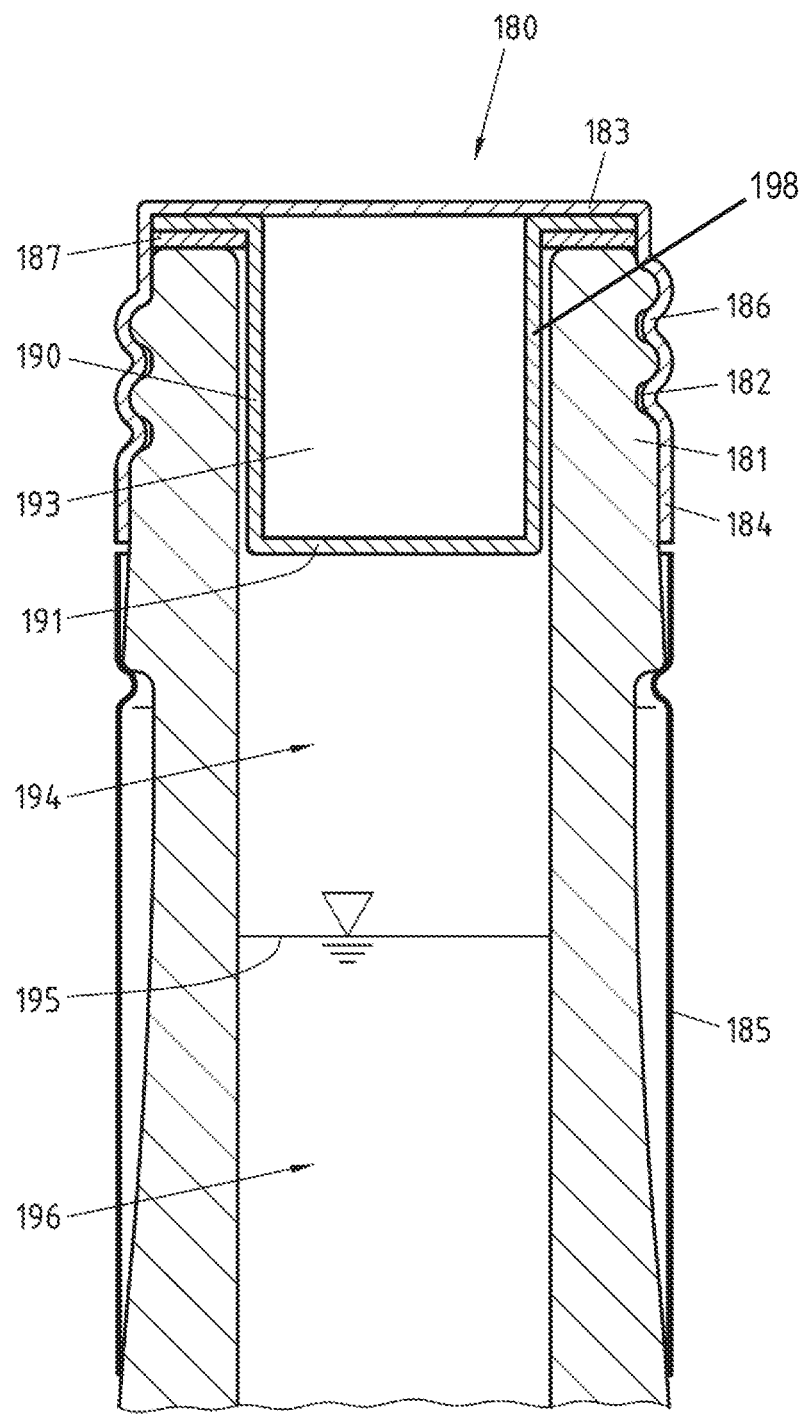
FIG. 13 is a longitudinal-section schematic view of a closure according to an exemplary embodiment of the present disclosure fitted on a wine bottle.

Referring now to FIG. 13, an alternate exemplary embodiment is illustrated. In this embodiment, a screw cap closure 180 adapted to fit on a wine bottle 181 is illustrated. The wine bottle 181 includes threads 182 on an upper opening as is well understood. The wine bottle 181 is filled with wine 196 up to a certain fluid level 195. In fitted position, the screw cap closure 180 includes an outer metal cap 183 having a head 184 and a skirt 185, interior threads 186 adapted to interoperate with threads 182 of the wine bottle 181 and a seal 187. The screw cap closure 180 further includes a cylindrically shaped reservoir 190 having a membrane 191 forming the bottom flat terminating end of the cylindrically shaped reservoir 190. In this embodiment, the outer metal cap 183 forms the top flat terminating end of the cylindrically shaped reservoir 190 and serves as a barrier layer. A cylindrical sidewall 198 extends between the membrane 191 and the outer metal cap 183 that serves as a barrier layer. The inside 193 of reservoir 190 is filled with a gas such as, for example, air or oxygen. The membrane 191 allows permeation of gases between the inside 193 of reservoir 190 and the head space 194 above the fluid level 195 of the wine bottle 181 filled with wine 196, thus replenishing oxygen into the head space 194 of the wine bottle 181 for a defined period of time.

Figure 14:
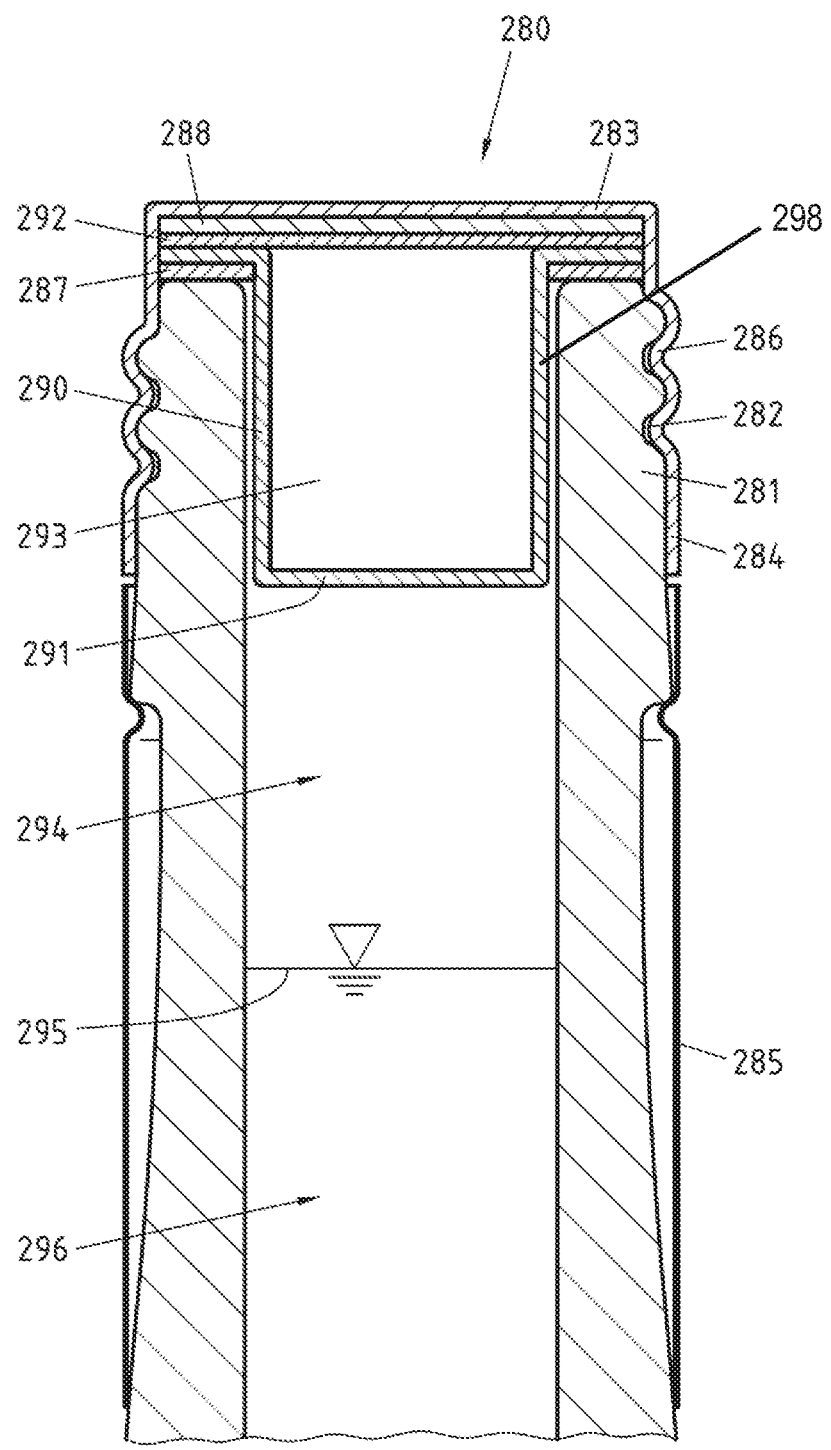
FIG. 14 is a longitudinal-section schematic view of a closure according to an exemplary embodiment of the present disclosure fitted on a wine bottle.

Referring now to FIG. 14, a further alternate exemplary embodiment is illustrated. In this embodiment, a screw cap closure 280 adapted to fit on a wine bottle 281 is illustrated. The wine bottle 281 includes threads 282 on an upper opening as is well understood. The wine bottle 281 is filled with wine 296 up to a certain fluid level 295. In fitted position, the screw cap closure 280 includes an outer metal cap 283 having a head 284 and a skirt 285, interior threads 286 adapted to interoperate with threads 282 of the wine bottle 281 and a seal 287. The screw cap closure 280 further includes a foamed backing 288. The screw cap closure 280 further includes a cylindrically shaped reservoir 290 having a membrane 291 forming the bottom flat terminating end of the cylindrically shaped reservoir 290 and a barrier layer 292 forming the top flat terminating end of the cylindrically shaped reservoir 290, with a cylindrical sidewall 298 extending between the membrane 291 and the barrier layer 292. The inside 293 of reservoir 290 is filled with a gas such as, for example, air or oxygen. The membrane 291 allows permeation of gases between the inside 293 of reservoir 290 and the head space 294 above the fluid level 295 of the wine bottle 281 filled with wine 296, thus replenishing oxygen into the head space 294 of the wine bottle 281 for a defined period of time.

Figure 15:
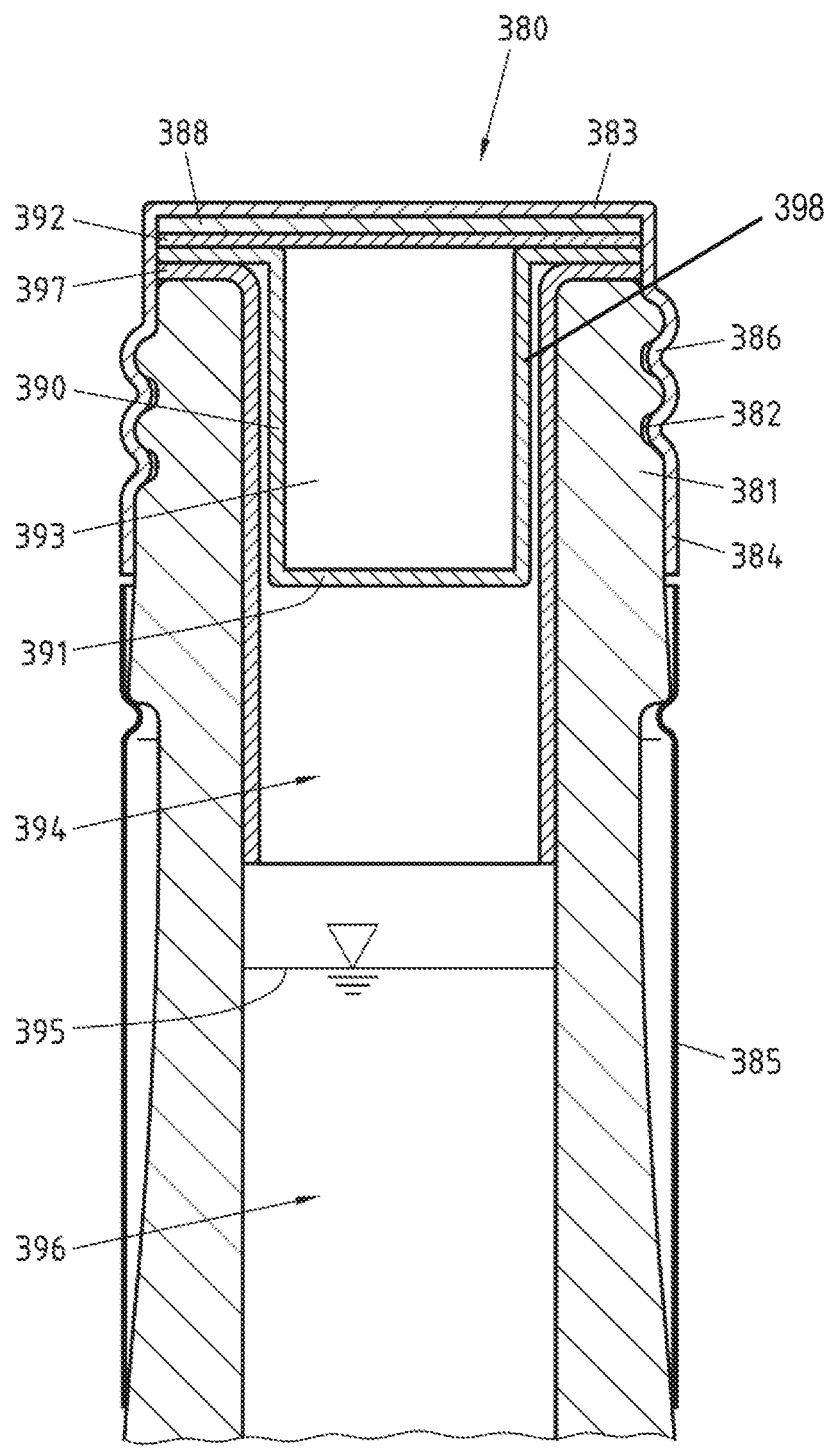
FIG. 15 is a longitudinal-section schematic view of a closure according to an exemplary embodiment of the present disclosure fitted on a wine bottle.

Referring now to FIG. 15, a further alternate exemplary embodiment is illustrated. In this embodiment, a screw cap closure 380 adapted to fit on a wine bottle 381 is illustrated. The wine bottle 381 includes threads 382 on an upper opening as is well understood. The wine bottle 381 is filled with wine 396 up to a certain fluid level 395. In fitted position, the screw cap closure 380 includes an outer metal cap 383 having a head 384 and a skirt 385, interior threads 386 adapted to interoperate with threads 382 of the wine bottle 381. The screw cap closure 380 further includes a foamed backing 388. The screw cap closure 380 further includes a cylindrically shaped reservoir 390 having a membrane 391 forming the bottom flat terminating end of the cylindrically shaped reservoir 390 and a barrier layer 392 forming the top flat terminating end of the cylindrically shaped reservoir 390, with a cylindrical sidewall 398 extending between the membrane 391 and the barrier layer 392. The inside 393 of reservoir 390 is filled with a gas such as, for example, air or oxygen. The membrane 391 allows permeation of gases between the inside 393 of reservoir 390 and the head space 394 above the fluid level 395 of the wine bottle 381 filled with wine 396, thus replenishing oxygen into the head space 394 of the wine bottle 381 for a defined period of time. The screw cap closure 380 further includes a plastic insert 397 extending radially downward into the neck of wine bottle 381. The uppermost part of the plastic insert 397 also serves the function of a seal. The plastic insert 397 is equipped with an oxygen scavenging agent. Such oxygen scavenging agent may effectively antagonize and decrease the initially high oxygen concentration immediately after bottling.

It will thus be seen that the objects set forth above, among those made apparent from the preceding description, are efficiently obtained and, since certain changes may be made in carrying out the above method without departing from the scope of this disclosure, it is intended that all matter contained in the above description or shown in the accompanying drawings shall be interpreted as illustrative and not in a limiting sense. Furthermore, it should be understood that the details of the disclosure described in the foregoing detailed description are not limited to the specific embodiments shown in the drawings but are rather meant to apply to the disclosure in general as outlined in the summary and in the claims.

It is also to be understood that the following claims are intended to cover all of the generic and specific features of the disclosure herein described, and all statements of the scope of the disclosure which, as a matter of language, might be said to fall there between.

What is claimed is:

1. A closure for a product retaining container, wherein said closure comprises a barrier layer, a membrane, and a gas containing reservoir including a cylindrical sidewall arranged between the barrier layer and the membrane, wherein said gas containing reservoir is filled with a gas, said membrane and the gas are configured to permit at least a portion of the gas to permeate through said membrane from said gas containing reservoir into an inside of the container, said barrier layer is configured to restrict or prevent exchange of gas between an outside of said closure and an inside of said gas containing reservoir, at least a portion of the cylindrical sidewall is configured to be received within a portal forming neck of the container, with the gas containing reservoir arranged within the portal forming neck when the at least a portion of the cylindrical sidewall is received within the portal forming neck.

2. The closure of claim 1, wherein said barrier layer is configured to restrict exchange of gas between the outside of said closure and the inside of said gas containing reservoir, and the exchange of gas is effected by means of permeation through said membrane.

3. The closure of claim 1, wherein said gas containing reservoir comprises hollow space.

4. The closure of claim 1, wherein the gas contained in said gas containing reservoir is selected from air, oxygen, ozone, nitrogen, sulfur oxides, carbon oxides, sulfur dioxide, carbon dioxide and mixtures thereof.

5. The closure of claim 1, wherein said gas containing reservoir has a shape selected from a substantially cylindrical shape, a substantially conical shape, a substantially half spherical shape, and a substantially dome shape.

6. The closure of claim 1, wherein said gas containing reservoir is substantially coaxial with the portal forming neck of the container.

7. The closure of claim 1, wherein said gas containing reservoir contains a gas volume of 0.01 to 30 cubic centimeters at ambient pressure and ambient temperature.

8. The closure of claim 1, wherein said gas containing reservoir contains a gas volume of 0.1 to 15 cubic centimeters at ambient pressure and ambient temperature.

9. The closure of claim 1, wherein said gas containing reservoir contains a gas volume of 0.5 to 10 cubic centimeters at ambient pressure and ambient temperature.

10. The closure of claim 1, wherein said membrane comprises a part selected from the group consisting of a plastic film, a laminated film, a multi-layer film, a metalized plastic film, an injection molded plastic part, an extruded plastic part, a co-extruded plastic part, a vacuum-formed plastic part, a blow-molded plastic part, and a deep-drawn plastic part.

11. The closure of claim 1, wherein said membrane has an oxygen permeation of about 0.00001 to about 0.1 cubic centimeters per day per container in 100% air at ambient pressure and ambient temperature.

12. The closure of claim 1, wherein said membrane has an oxygen permeation of about 0.00005 to about 0.05 cubic centimeters per day per container in 100% air at ambient pressure and ambient temperature.

13. The closure of claim 1, wherein said membrane has an oxygen permeation of about 0.0001 to about 0.01 cubic centimeters per day per container in 100% air at ambient pressure and ambient temperature.

14. The closure of claim 1, wherein said membrane has an oxygen permeation of about 0.0005 to about 0.005 cubic centimeters per day per container in 100% air at ambient pressure and ambient temperature.

15. The closure of claim 1, wherein said membrane has an oxygen permeation at ambient pressure and ambient temperature that is different from that of said barrier layer.

16. The closure of claim 1, wherein said membrane forms an integral part of said gas containing reservoir.

17. The closure of claim 1, wherein said barrier layer comprises a part selected from the group consisting of a plastic film, a laminated film, a multi-layer film, a metalized plastic film, an injection molded plastic part, an extruded plastic part, a co-extruded plastic part, a vacuum-formed plastic part, a blow-molded plastic part, and a deep-drawn plastic part.

18. The closure of claim 1, wherein said barrier layer comprises a material selected from the group consisting of tin and its alloys, aluminum and its alloys, steel and its alloys, glass, thermoplastic elastomers (TPE), polyvinyl chloride (PVC), styrene block copolymers, ethylene vinyl alcohol (EVOH), nylon, filled nylon, and combinations thereof.

19. The closure of claim 1, wherein said barrier layer has an oxygen permeation of about 0 to about 0.05 cubic centimeters per day per container in 100% air at ambient pressure and ambient temperature.

20. The closure of claim 1, wherein said barrier layer has an oxygen permeation of about 0 to about 0.01 cubic centimeters per day per container in 100% air at ambient pressure and ambient temperature.

21. The closure of claim 1, wherein said barrier layer has an oxygen permeation of about 0 to about 0.002 cubic centimeters per day per container in 100% air at ambient pressure and ambient temperature.

22. The closure of claim 1, wherein said barrier layer has an oxygen permeation of about 0 to about 0.001 cubic centimeters per day per container in 100% air at ambient pressure and ambient temperature.

23. The closure of claim 1, wherein said barrier layer has an oxygen permeation that is lower than that of said membrane.

24. The closure of claim 1, wherein said barrier layer and said membrane have about a same oxygen permeability.

25. The closure of claim 1, wherein said barrier layer forms an integral part of said gas containing reservoir.

26. The closure of claim 1, wherein said closure further comprises a body that comprises metal or a combination of metal and polymer material.

27. The closure of claim 26, wherein said metal is selected from the group consisting of aluminum and tin and alloys thereof.

28. The closure of claim 26, wherein said polymer material is selected from the group consisting of polyethylene (PE), polypropylene (PP), polyethylene terephthalate (PET), low density polyethylene (LDPE), and high density polyethylene (HDPE).

29. The closure of claim 1, wherein said closure comprises a threadless, substantially cylindrically shaped bottle stopper.

30. The closure of claim 1, wherein said closure comprises a bottle cap selected from the group consisting of: a screw cap, a roll-on pilfer proof screw cap, a roll-on tamper evident screw cap, and a crown cap.

31. The closure of claim 1, wherein the container is a wine bottle.

32. The closure of claim 1, wherein said closure further comprises a sealant layer.

33. The closure of claim 32, wherein said sealant layer is adapted to be held under compression against at least a portion of a surface of the container.

34. The closure of claim 32, wherein the container is a wine bottle and said sealant layer is adapted to be held under compression against an uppermost rim of a mouth of the wine bottle.

35. The closure of claim 32, wherein said sealant layer comprises a material selected from the group consisting of tin and its alloys, aluminum and its alloys, steel and its alloys, glass, thermoplastic elastomers (TPE), polyvinyl chloride (PVC), styrene block copolymers, ethylene vinyl alcohol (EVOH), nylon, filled nylon, and combinations thereof.

36. The closure of claim 1, wherein said closure further comprises an oxygen scavenging agent.

37. The closure of claim 36, wherein said oxygen scavenging agent is selected from the group consisting of ascorbates, sulfites, ethylenediaminetetraacetic acid (EDTA), hydroquinone, iron or other metallic active species, tannins and their salts and precursors, and combinations thereof.

38. The closure of claim 1, wherein said membrane and said barrier layer are devoid of contact with any surface of the portal forming neck when the at least a portion of said cylindrical sidewall is received within the portal forming neck.

39. The closure of claim 1, wherein said closure comprises a polymer material.

* * * * *